United States Patent [19]

Bergen

[11] 4,219,012
[45] Aug. 26, 1980

[54] SOLAR HEATING WITH AIR TRANSFER

[75] Inventor: Bernard J. Bergen, Vinton, Iowa

[73] Assignee: Addison Products Company, Addison, Mich.

[21] Appl. No.: 664,079

[22] Filed: Mar. 5, 1976

[51] Int. Cl.² ............................................... F24J 3/02
[52] U.S. Cl. .................................. 126/449; 126/436; 126/400
[58] Field of Search ............. 126/270, 271, 400, 430, 126/428, 436, 449, 448, 446; 237/1 A; 165/18

[56] References Cited

U.S. PATENT DOCUMENTS

| | | | |
|---|---|---|---|
| 679,451 | 7/1901 | Baker | 126/270 |
| 2,490,659 | 12/1949 | Snyder | 126/271 |
| 2,677,367 | 5/1954 | Telkes | 165/104 S |
| 3,145,707 | 8/1964 | Thomason | 126/271 |
| 3,179,105 | 4/1965 | Falbel | 126/271 |
| 3,960,135 | 6/1976 | Angilletta | 126/270 |
| 3,990,635 | 11/1976 | Restle et al. | 126/270 |
| 3,994,276 | 11/1976 | Pulver | 126/270 |
| 3,996,918 | 12/1976 | Quick | 126/270 |
| 4,036,209 | 7/1977 | Press | 126/271 |
| 4,073,283 | 2/1978 | Lof | 126/270 |
| 4,130,108 | 12/1978 | Patil | 126/270 |

FOREIGN PATENT DOCUMENTS

| | | | |
|---|---|---|---|
| 276788 | 11/1965 | Australia | 126/270 |
| 2120345 | 11/1972 | Fed. Rep. of Germany | 126/270 |
| 645802 | 9/1962 | Italy | 165/170 |

*Primary Examiner*—James C. Yeung
*Attorney, Agent, or Firm*—John A. Brady

[57] ABSTRACT

A solar heating system with one or more collector panels having an insulative, fiberglass top, black, heat-producing plates and an air manifold at each end. Cold air is transmitted through a manifold, across the plates and out the other manifold. The heated air is directed to a heat-storage compartment in which heat is stored in containers of wax.

17 Claims, 6 Drawing Figures

CONTAINERS OF WAX 21

INSULATED HEAT STORAGE 19

COOL AIR FROM STORAGE

SOLAR COLLECTORS IN SERIES

COLD AIR FLOW SUPPLIED BY 1 FAN

HEAT STORAGE FILLED WITH 1 GAL. CANISTERS OF PARAFFIN

COLD RETURN

HOT AIR TO HOUSE

SINGLE COLLECTOR

HOT AIR FROM COLLECTORS

HOT AIR FLOW SUPPLIED BY 1 FAN

SOLAR HEATING WITH AIR TRANSFER

BACKGROUND OF THE INVENTION

This invention relates to heating dwellings and other structures by sunlight.

Heating by sunlight has a number of inherent, well-recognized advantages, particularly resulting because solar systems do not generally produce air pollutant nor do they consume any limited resource. Typically in solar systems a dark object is placed in a heat-insulative container which admits sunlight. The sun rays are converted to heat by the dark object and are trapped by the insulation. Heat is taken out through a circulated fluid, which may be water or air.

Extraction of the heat by air or some other readily available gas is quite desirable since the use of air for heat transfer yields the following benefits:

(1) Air is much less corrosive to its ducts than typical liquids;
(2) Air does not require expensive sealing and incasement;
(3) Air is light-weight and readily mobile;
(4) Air does not freeze and thus it does not raise antifreeze or draining requirements; and
(5) Air is readily adaptable to existing heat duct systems.

It is the primary object of this invention to provide a solar heating system well suited to the use of atmospheric air to transfer heat.

Similarly, it is a more specific object of this invention to provide a solar heating system for a dwelling or other structure which employs simple and small electric fans to circulate air to transfer heat.

It is another object of this invention to achieve the foregoing objects with a system which is adapted to be readily increased and decreased in size of heat absorbtion area.

Additionally, the heat collector units provided in accordance with this invention are light weight and therefore are not subject to expensive structural requirements either for themselves or for their supporting structure.

SUMMARY OF THE INVENTION

The essential feature of the invention is a collector having a transparent face and an elongated, dark plate spaced from and generally opposite said face. Extending across each end are relatively large air ducts, which have a series of relatively small holes spaced along their side. Air enters the large ducts and enters the plate area through the small openings, so the air flow is distributed across the ends of the ducts and flows across the plates.

More than one of the collectors may be used with their large ducts connected by an air conduit. In fact, a feature of the invention is that the collectors preferably are designed so that they may be simply placed side-by-side and their ducts will be in communication.

The heated air is conveyed from the outlet duct to a storage casement of a nature basically well known in the art.

The primary area of novelty of this invention is believed to be in the design which includes and makes possible the air manifold whereby air is distributed across the dark plate or plates.

Other objects, features, characteristics and advantages of this invention will be apparent upon consideration of the following detailed description of the present preferred embodiment of the invention, as illustrated in the following drawings.

DESCRIPTION OF THE PREFERRED EMBODIMENT

Figure 1:
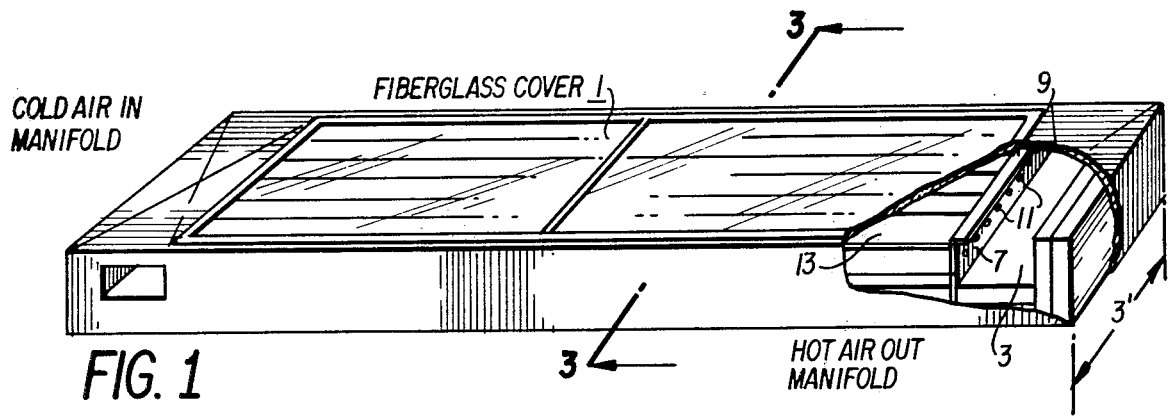
FIG. 1 is a view, partially broken away and from an angle taken somewhat from above, of the preferred collector.

FIG. 1 illustrates a single collector unit. It has a top, transparent window 1, which is substantially coextensive with the entire top part except for the duct portions 3 and the insulation around the ducts 3. The window 1 is of fiberglass (in this preferred embodiment Kal-Wall Premium 0.040), which is heat-insulative and transparent to sunlight.

The collector 1, when viewed from directly above and down or normal to the window 1 is a rectangle 8 feet in length and 3 feet wide. The collector is 10 inches in thickness.

Figure 2:
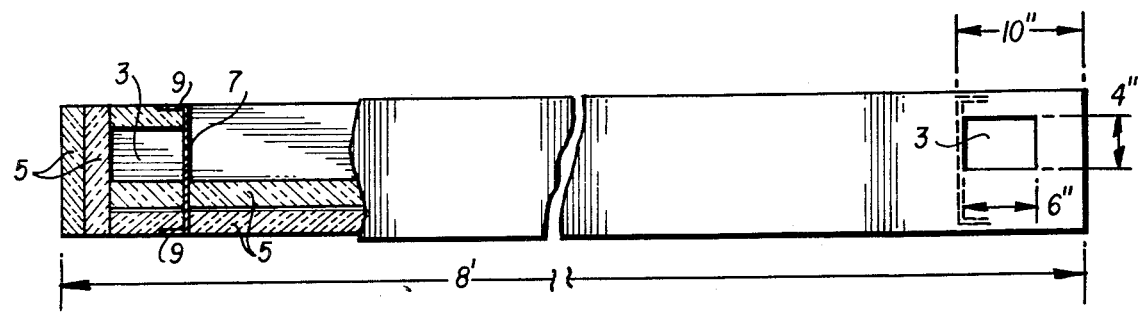
FIG. 2 is a side view of the collector of FIG. 1 with the left part broken away.

The ducts 3 are located on each end of the collector and extend entirely across the 3 feet ends. As shown in FIG. 2, the ducts are surrounded by layers 5 of urethane insulation, 4 inches thick on the bottom and at the far sides of the collector (actually formed as indicated in the drawing by two layers of 2 inch thick urethane sheets). Across the top of the ducts 3 up to the location of the window 1 is a single layer of urethane insulation 2 inches thick.

On each side of the ducts 3 immediately contiguous with the window 1 is an aluminum baffle sheet 7, which is 0.050 inch thick and extends vertically from top to bottom the full ten inches, with short, perpendicular flanges 9 on each end directed away from the window 1. The sides of the ducts 3 facing the window 1 are provided by the baffle sheets 7.

The ducts 3 in cross section are thus 4 inches high and 6 inches wide (24 square inches). Spaced equal distances along the ducts 3 are thirteen holes 11 in each duct 3 through baffle 7, each ½ inch in diameter (best shown in the broken away portion of FIG. 1). The holes 11 provide a free communication for air through the ducts 3 into the interior of the collector.

Figure 3:
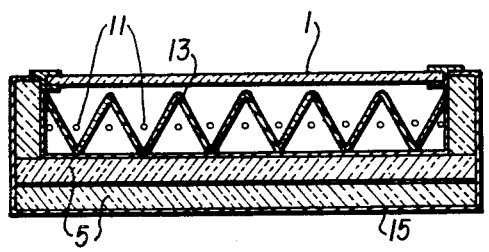
FIG. 3 is an end view of the collector through the section 3—3 indicated in FIG. 1.
Figure 4:
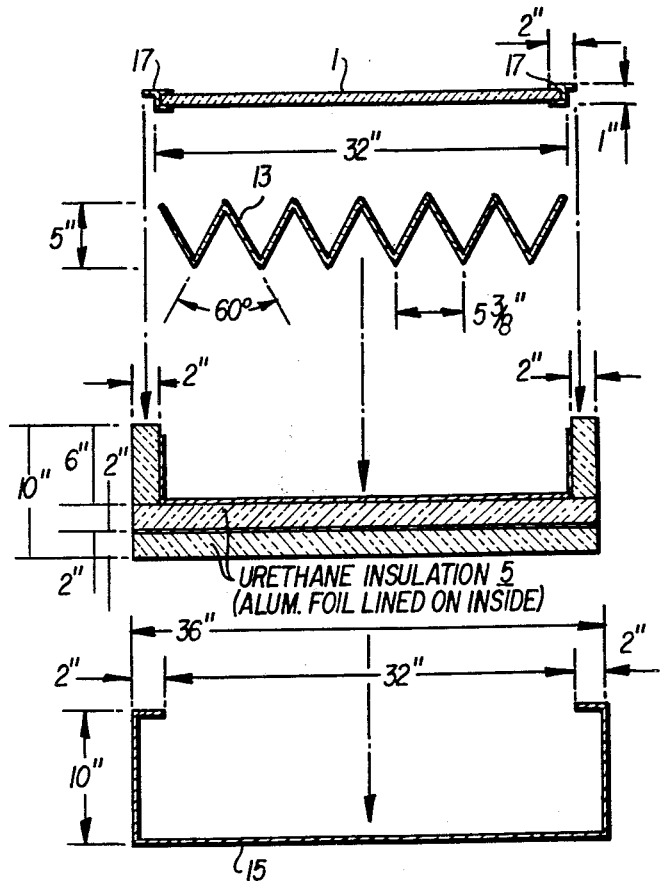
FIG. 4 is the same view as FIG. 3, but with the sub-elements shown separated for purposes of better illustration.

The interior of the collector holds the heat-conversion plate 13, as illustrated in FIG. 3. Plate 13 is comprised of a 0.024 inch aluminum plate (specifically, 3003 H14 Stuco Embossed), painted with a standard automotive flat (i.e., non-reflective) black paint. (In time, paints especially adapted to the purpose of transforming sunlight to heat will probably prove more desirable, but currently the automotive paint is the one used). The plate 13 is shown in FIG. 4 with its major dimensions. It is fashioned into a regular zig-zag and accordingly so appears when viewed in cross section as in FIG. 4. The plate 13 is 5 inches high vertically, extends entirely across the collector until it contacts the insulation on each side, and has a distance from peak-to-peak of the zig-zag pattern when viewed in cross section is 5⅜ inches. The angles of the zig-zag are each 60 degrees.

As shown in FIG. 4, the collector has an outer cabinet 15 of aluminum. This is 0.050 inch thick (also in this embodiment 3003 H14 Stuco embossed). The cabinet 15 is rectangular, 3 feet wide and 10 inches high, and with top, perpendicular flanges 2 inches in length.

Accordingly, the window 1 fits in the 32 inch wide opening of the cabinet 15. As also shown in FIG. 4, the window 1 is held in brackets 17, which fit around the top and bottom of the window and extend across the window 1 as illustrated. The top part of the brackets extent away from the window one inch, which extension in the assembled collector rests on the top flange of the cabinet 15.

Finally, the part of the collector under the window contains layers of insulation 5, specifically, two 2 inch thick layers on the bottom and one 2 inch wide layer on each side.

Thus, in the area under the window in the completed collector, the plate 13 is surrounded by insulation and is spaced from the window 1 such that air can enter this area from holes 11, then move in contact with or in close vicinity with the plate 13, and then exit through holes 11 on the opposite side of the collector.

Figure 5:
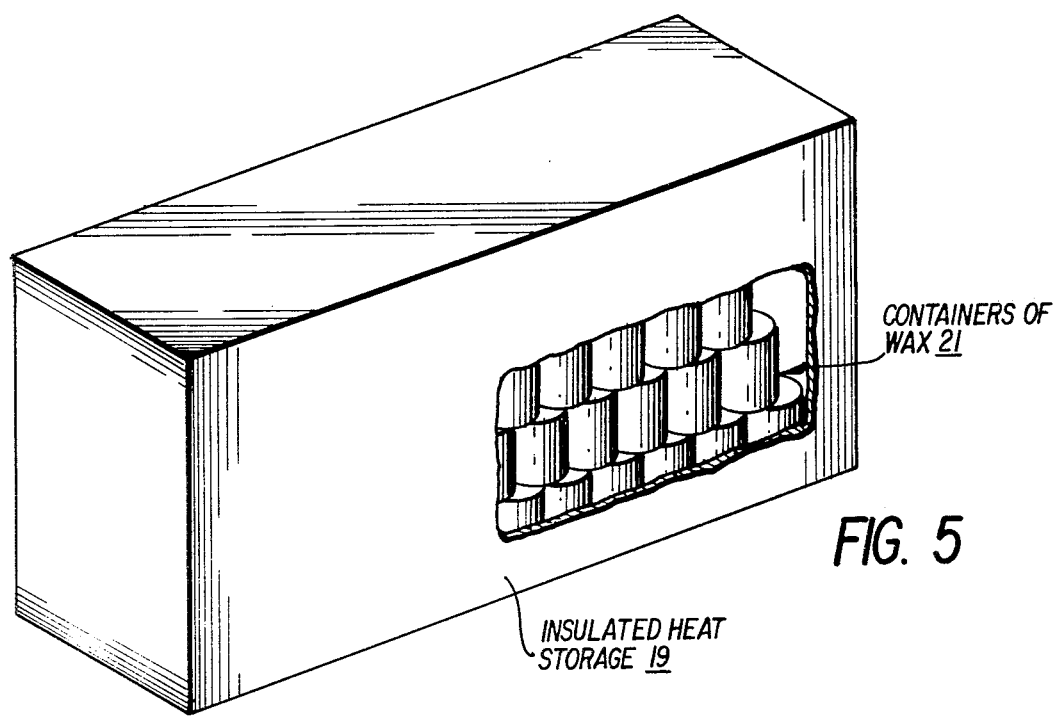
FIG. 5 is a view partially broken away and from an angle of the heat storage compartment of the preferred embodiment.

The heat storage elements of this embodiment are illustrated generally in FIG. 5. This comprises a compartment 19 (made with ⅝ inch exterior plywood, 4 inch thick polystyrene insulation and ½ inch interior plywood). The compartment 19 simply contains a number of one gallon canisters 21 of a material which naturally stores heat. Heat storage compartments such as just described are believed to be a standard technique in the art. In this embodiment the canisters 21 are filled with a commercially available paraffin wax. An electric heating coil (not shown) is contained within the compartment 19 to generate extra heat during peak demands such as would follow extreme cold or a prolonged period of cold beyond the capabilities of the solar system.

Figure 6:
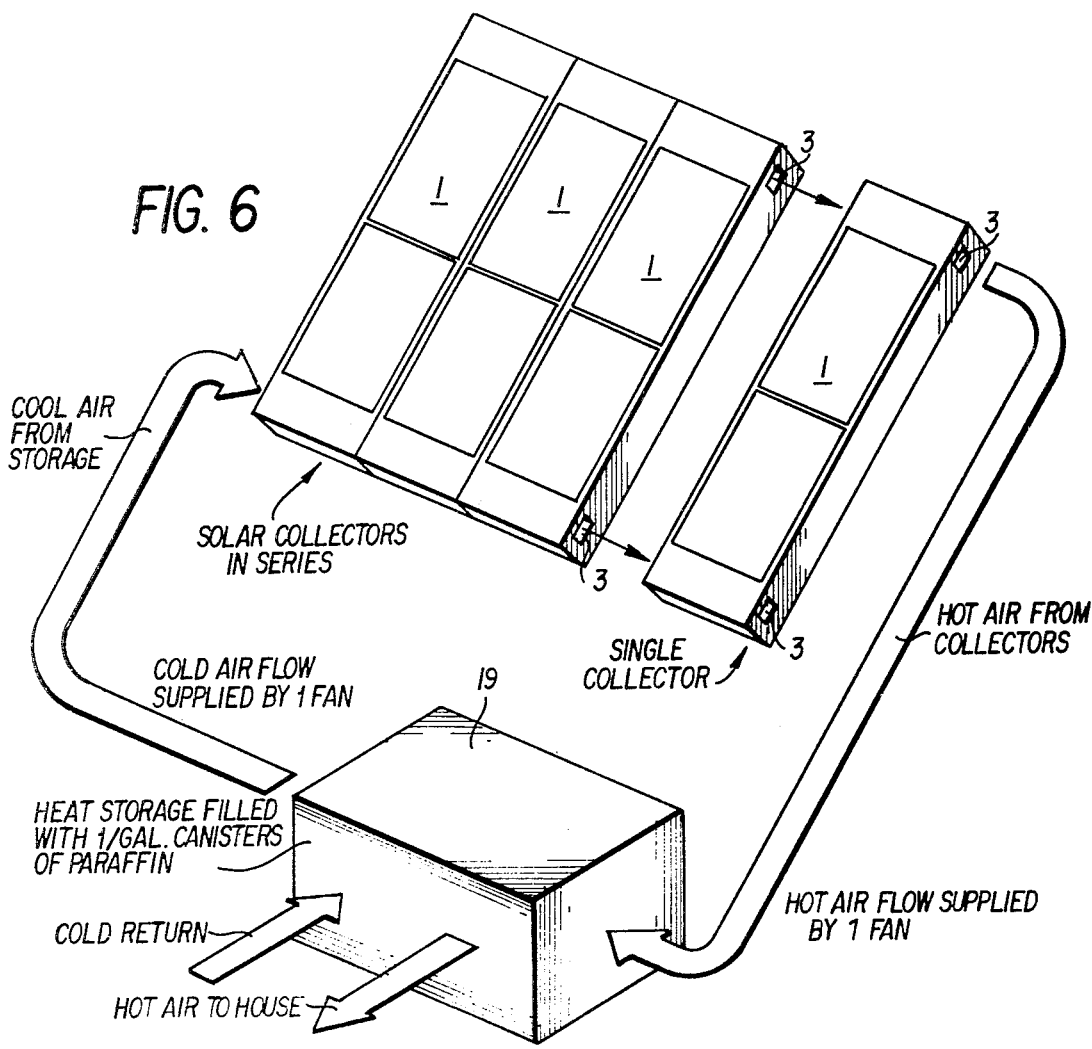
FIG. 6 is an illustration, partially symbolic, of a multi-collector heating system for a dwelling in accordance with the preferred embodiment.

FIG. 6 illustrates the collectors as described in use in a typical system. A major feature of the invention is also illustrated in FIG. 6 in that it shows that the collectors are designed for multiple, simultaneous use. Thus, the collectors are rectangular, with straight longitudinal and vertical sides. They may simply be placed side-by-side and their ducts 3 are in communication for the circulation of air jointly in the combined system.

Operation of the Preferred System

As shown in FIG. 6, in a heating system for a dwelling or other structure in accordance with this invention, one or more of the collectors may be used. Cold air from the structure to be heated is propelled by a conventional circulation fan (not shown) to the duct 3 of the first collector of the series of collectors in use. (The far, opposite end of the series of ducts 3 of the collectors is, of course, plugged.) The collectors are located in an area exposed to the sun, such as the roof of the building to be heated.

The air enters the ducts 3 and is distributed across the areas under the windows 1 by the holes 11. The air is unimpeded in the collectors and flows across or near the zig-zag plates 13. The plates 13 constantly transform sunlight entering windows 1 into heat. (The V shape of the plates provide a method of optimal receptivity to the rays of the sun throughout daylight hours.)

The heated air then exits from the holes 11 on the opposite side of the collectors into the duct or ducts 3. The hot air is propelled by a conventional fan (not shown) into the heat-storage compartment 19, and from there to the building to be heated. Heat is, of course, extracted by the filled canisters 21 in the compartment basically when more heat is being generated than is currently consistent with the temperature in the compartment 19. Conversely, the compartment 19 yields heat to the air, as is desired, subsequently when too little heat is being produced by the solar collectors.

As mentioned in connection with FIG. 6, in periods of extreme or prolonged cold, an electric heater will be activated in compartment 19.

It will be apparent that this invention can take many different forms and yet be within the spirit and substance of the contributions herein disclosed. Accordingly, patent coverage should not be limited to the present preferred form here described, which, in fact, is presently being improved upon and modified for that purpose, but should be as provided by law, with particular reference to the accompanying claims.

What is claimed is:

1. A solar heat collector comprising a heat-insulative enclosure including at least one surface area transparent to sunlight, material in zig-zag configuration in cross section as viewed from said ducts, said zig-zag material being spaced from said transparent area and absorbent to sunlight such that sunlight absorbed is transformed into heat energy, ducts extending across opposite sides of said collector, a plurality of holes of the same general size, said holes being small relative to the size of said ducts in each said ducts communicating with the interior of said collector from said ducts; neither said material or any other structure in said collector blocking free flow of air through said holes, across the vicinity of said material, and out of the other holes, the cross-sectional area of said ducts throughout the length of said ducts as viewed from the side being at least in the order of magnitude of thirty times the cross-sectional area of one of said holes as viewed from the side of said holes, said ducts extending to the side of said collector for communication with air under pressure from without said collector.

2. The collector as in claim 1 in which said transparent area is a heat-insulative plate forming substantially all of one side of said enclosure.

3. The collector as in claim 2 in which said material is comprised of flat plates forming said zig-zag configuration painted with black, non-reflective paint.

4. The collector as in claim 3 in which said collector is rectangular when viewed from a position substantially normal to said heat insulative plate and said flat plates forming said zig-zag comprise a series of plates at an angle.

5. The collector as in claim 3 in which each said duct is substantially identical throughout its length and has a cross section in the general order of magnitude of 24 square inches in area and in which said holes on each side are substantially evenly spaced along each said duct and are in number in each duct in the general order of magnitude of 13 in a three foot length of said duct.

6. Two collectors as described in claim 1, each adapted to be placed side-by-side and thereby have said ducts abut and be in communication.

7. The two collectors as in claim 6 in which said transparent area is a heat-insulative plate forming substantially all of one side of said enclosure.

8. The two collectors as in claim 7 in which said material is comprised of flat plates forming said zig-zag configuration painted with black, non-reflective paint.

9. The two collectors as in claim 8 in which said collector is rectangular when viewed from a position substantially normal to said heat-insulative plate and said flat plates forming said zig-zag comprise a series of plates at an angle.

10. The two collectors as in claim 9 in which each said duct is substantially identical throughout its length and has a cross section in the general order of magnitude of 24 square inches in area and in which said holes on each side are substantially evenly spaced along each said duct and are in number in each duct in the general order of magnitude of 13 in a three foot length of said duct 11. Two collectors as described in claim 1, each having the ends of said ducts in the same position on one side and at least said one side being straight both longitudinally and vertically, said one side having no obstruction to prevent said collectors from being placed with said one sides together with the ducts of the two collectors in communication.

12. A system to heat a structure by sunlight comprising at least one collector as described in claim 1 located to receive sunlight, a heat insulative compartment containing a plurality of containers of a wax material absorbent to heat, means to circulate air from the interior of said structure into one duct of said at least one collector, then from the said opposite duct of said at least one collector, then through said compartment with containers, and then in said structure.

13. The system as in claim 12 in which said material in said collector comprises a series of plates at an angle forming a regular zig-zag; and in which the sides of the plates which form said zig-zag in cross section each face one of said ducts; and in which each said duct is substantially identical throughout its length and has a cross section in the general order of magnitude of 24 square inches and said holes are in the general order of magnitude of ½ inch in diameter and are substantially evenly spaced along said ducts with the number of said holes in each said duct being in the general order of magnitude of 13 in a three foot length of said duct.

14. A solar heat collector comprising a heat-insulative enclosure including at least one surface transparent to sunlight, a plurality of flat plates positioned at an acute angle to adjoining ones of said plates in cross section and extending substantially straight across the inside of said collector to receive sunlight on their flat surfaces through said transparent surface, said flat surfaces of said plates comprising material which inherently transforms sunlight into heat energy, two ducts, each extending across said enclosure, said two ducts being on opposite sides of said enclosure where said plates are at an angle in cross section, a plurality of holes spaced along said ducts communicating to the region in said enclosure generally contiguous to the ends of said plates, said holes being of the same general size and being of size such that air under pressure is generally evenly distributed through said holes and across said plates, the cross-sectional area of said ducts throughout the length of said ducts as viewed from the side being at least in the order of magnitude of one hundred twenty times the cross-sectional area of one of said holes as viewed from the side of said holes, said ducts extending to the side of said collector for communication with air under pressure from without said collector.

15. The collector as in claim 14 in which said plates form a regular zig-zag.

16. Two collectors as in claim 14, each adapted to be placed side-by-side and thereby have said ducts abut and be in communication.

17. Two collectors as described in claim 15, each adapted to be placed side-by-side and thereby have said ducts abut and be in communication.

* * * * *

UNITED STATES PATENT AND TRADEMARK OFFICE
CERTIFICATE OF CORRECTION

PATENT NO. : 4,219,012

DATED : August 26, 1980

INVENTOR(S) : Bernard J. Bergen

It is certified that error appears in the above-identified patent and that said Letters Patent are hereby corrected as shown below:

Col. 2, line 32, that portion reading "collector 1, when" should read --collector, when--. Instead of Claim 1 as printed, insert the following Claim 1:

1. A solar heat collector comprising a heat-insulative enclosure including at least one surface area transparent to sunlight, ducts extending across opposite sides of said collector, a plurality of holes of the same general size, said holes being small relative to the size of said ducts in each said ducts communicating with the interior of said collector from said ducts, material in zig-zag configuration in cross section as viewed from said ducts, said zig-zag material being spaced from said transparent area and absorbent to sunlight such that sunlight absorbed is transformed into heat energy; neither said material or any other structure in said collector blocking free flow of air through said holes, across the vicinity of said material, and out the other holes, the cross-sectional area of said ducts throughout the length of said ducts as viewed from the side being at least in the order of magnitude of one hundred twenty times the cross-sectional area of one of said holes as

UNITED STATES PATENT AND TRADEMARK OFFICE
CERTIFICATE OF CORRECTION

PATENT NO. : 4,219,012

DATED : August 26, 1980

INVENTOR(S) : Bernard J. Bergen

It is certified that error appears in the above–identified patent and that said Letters Patent are hereby corrected as shown below:

viewed from the side of said holes, said ducts extending to the side of said collector for communication with air under pressure from without said collector.

And in Claim 13, at Col. 6, line 2, that portion reading "of24" should read --of 24--.

Signed and Sealed this

Sixth Day of January 1981

[SEAL]

Attest:

SIDNEY A. DIAMOND

Attesting Officer

Commissioner of Patents and Trademarks